3,101,263
HERBICIDAL METHOD
Harry Tilles, El Cerrito, and Joe Antognini, Mountain View, Calif., assignors to Stauffer Chemical Company, a corporation of Delaware
No Drawing. Filed Apr. 20, 1959, Ser. No. 807,344
7 Claims. (Cl. 71—2.3)

This invention relates to certain cycloalkyl esters of disubstituted thiolcarbamic acids as herbicides, and as new compounds. More specifically, the invention relates to compounds of the general formula:

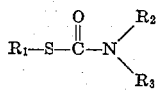

wherein $R_1$ is a cycloalkyl radical and wherein $R_2$ and $R_3$ are selected from the same and different lower alkyl and lower allyl radicals. Typical non-limiting examples of the various substituents are as follows:

| $R_1$ | $R_2$ | $R_3$ | |
|---|---|---|---|
| Cyclohexyl | $C_2H_5$ | $C_2H_5$ | (R-2985) |
| Do | n-$C_3H_7$ | n-$C_3H_7$ | (R-3075) |
| Do | n-$C_4H_9$ | $C_2H_5$ | (R-3078) |
| Do | $CH_2=CHCH_2$ | n-$C_3H_7$ | (R-3073) |
| Do | $CH_2=CHCH_2$ | $CH_2=CHCH_2$ | (R-3072) |
| Do | $CH_2=C(CH_3)CH_2$ | $C_2H_5$ | (R-3079) |
| Cyclopentyl | $C_2H_5$ | $C_2H_5$ | (R-2808) |
| Do | n-$C_3H_7$ | n-$C_3H_7$ | (R-2809) |
| Do | n-$C_4H_9$ | $C_2H_5$ | (R-3091) |
| Do | $CH_2=CHCH_2$ | $CH_2=CHCH_2$ | (R-3083) |
| Do | $CH_2=CHCH_2$ | n-$C_3H_7$ | (R-3084) |
| Do | $CH_2=C(CH_3)CH_2$ | $C_2H_5$ | (R-3092) |

*Example I*

(R-2985).—6 g. (0.034 mole) of cyclohexyl chlorothiolformate was added dropwise to a solution of 5.4 g. (0.074 mole) of diethylamine in 100 cc. of ethyl ether. After standing for 5 min., 50 cc. of water were added and the phases separated. The ether phase was then washed with 2-50 cc. portions of 5% HCl and 2-50 cc. portions of water. The organic phase was then dried over anhydrous magnesium sulfate, filtered and the filtrate was concentrated on the steam bath. The residual liquid was then fractionally distilled through an 18″ Podbielniak Heli-Grid fractional distillation column. There was obtained 4.6 g. (63.2% yield) of cyclohexyl N,N-diethylthiolcarbamate, B.P. (10 mm.) 147.0–147.1° C., $n_D^{30}$ 1.5019.
Analysis.—Calcd. for $C_{11}H_{21}NOS$: N, 6.50%. Found: N, 6.50%.

*Example II*

(R-3075).—When the general procedure of Example I was repeated except that 7.5 g. (0.074 mole) of di-n-propylamine, 6 g. (0.034 mole) of cyclohexyl chlorothiolformate and 100 cc. of ethyl ether were employed, there was obtained 4.3 g. (52.3% yield) of cyclohexyl N,N-di-n-propylthiolcarbamate, B.P. (10 mm.) 165.5–166.0° C., $n_D^{30}$ 1.4965.
Analysis.—Calcd. for $C_{13}H_{25}NOS$: N, 5.75%. Found: N, 5.64%.

*Example III*

(R-3072).—When the general procedure of Example I was repeated except that 7.2 g. (0.0740 mole) of diallylamine, 6 g. (0.034 mole) of cyclohexyl chlorothiolformate and 100 cc. of ethyl ether were employed, there was obtained 4.5 g. (56.2% yield) of cyclohexyl N,N-diallylthiolcarbamate, B.P. (10 mm.) 164.5–165.0° C., $n_D^{30}$ 1.5160.
Analysis.—Calcd. for $C_{13}H_{21}NOS$: N, 5.85%. Found: N, 5.96%.

*Example IV*

(R-3073).—When the general procedure of Example I was repeated except that 7.3 g. (0.074 mole) of N-allyl-n-propylamine, 6 g. (0.034 mole) of cyclohexyl chlorothiolformate and 100 cc. of ethyl ether were employed, there was obtained 4.9 g. (60.3% yield) of cyclohexyl N-allyl-N-n-propylthiolcarbamate, B.P. (10 mm.) 165.0–165.5° C., $n_D^{30}$ 1.5064.
Analysis.—Calcd. for $C_{13}H_{23}NOS$: N, 5.80%. Found: N, 5.79%.

*Example V*

(R-3078).—When the general procedure of Example I was repeated except that 7.5 g. (0.074 mole) of N-ethyl-n-butylamine, 6 g. (0.034 mole) of cyclohexyl chlorothiolformate and 100 cc. of ethyl ether were employed, there was obtained 5.2 g. (63.8% yield) of cyclohexyl N-ethyl-N-n-butylthiolcarbamate, B.P. (10 mm.) 167.0–168.0° C., $n_D^{30}$ 1.4971.
Analysis.—Calcd. for $C_{13}H_{25}NOS$: N, 5.75%. Found: N, 5.82%.

*Example VI*

(R-3079).—When the general procedure of Example I was repeated except that 7.3 g. (0.074 mole) of N-methallylethylamine, 6 g. (0.034 mole) of cyclohexyl chlorothiolformate and 100 cc. of ethyl ether were employed, there was obtained 4.7 g. (58.5% yield) of cyclohexyl N-methallyl-N-ethylthiolcarbamate, B.P. (10 mm.) 161.0–161.5° C., $n_D^{30}$ 1.5080.
Analysis.—Calcd. for $C_{13}H_{23}NOS$: N, 5.80%. Found: N, 5.83%.

*Example VII*

(R-3083).—When the general procedure of Example I was repeated except that 10.7 g. (0.11 mole) of diallylamine, 8.2 g. (0.05 mole) of cyclopentyl chlorothiolformate and 100 cc. of ethyl ether were employed, there were obtained 6.4 g. (56.9% yield) of cyclopentyl N,N-diallylthiolcarbamate, B.P. (10 mm.) 153.5–154.0° C., $n_D^{30}$ 1.5157.
Analysis.—Calcd. for $C_{12}H_{19}NOS$: N, 6.22%. Found: N, 6.24%.

*Example VIII*

(R-2808).—When the general procedure of Example I was repeated except that 8.0 g. (0.11 mole) of diethylamine, 8.2 g. (0.05 mole) of cyclopentyl chlorothiolformate and 100 cc. of ethyl ether were employed, there was obtained 7.0 g. (69.0% yield) of cyclopentyl N,N-diethylthiolcarbamate, B.P. (10 mm.) 135.0–136.0° C., $n_D^{30}$ 1.5011.
Analysis.—Calcd. for $C_{10}H_{19}NOS$: N, 6.96%. Found: N, 6.70%.

*Example IX*

(R-2809).—When the general procedure of Example I was repeated except that 11.1 g. (0.11 mole) of di-n-propylamine, 8.2 g. (0.05 mole) of cyclopentyl chlorothiolformate and 100 cc. of ethyl ether were employed, there was obtained 9.0 g. (78.8% yield) of cyclopentyl N,N-di-n-propylthiolcarbamate, B.P. (10 mm.) 153.0–154.0° C., $n_D^{30}$ 1.4949.
Analysis.—Calcd. for $C_{12}H_{23}NOS$: N, 6.11%. Found: N, 6.27%.

Example X (*R-3084*).—When the general procedure of Example I was repeated except that 10.9 g. (0.11 mole) of N-allyl-n-propylamine, 8.2 g. (0.05 mole) of cyclopentyl chlorothiolformate and 100 cc. of ethyl ether were employed, there was obtained 7.6 g. (67.1% yield) of cyclopentyl N-allyl-N-n-propylthiolcarbamate, B.P. (10 mm.) 153.0–153.5° C., $n_D^{30}$ 1.5053.

*Analysis.*—Calcd. for $C_{12}H_{21}NOS$: N, 6.16%. Found: N, 6.23%.

Example XI (*R-3091*).—When the general procedure of Example I was repeated except that 11.1 g. (0.11 mole) of N-ethyl-n-butylamine, 8.2 g. (0.05 mole) of cyclopentyl chlorothiolformate and 100 cc. of ethyl ether were employed, there was obtained 8.4 g. (73.2% yield) of cyclopentyl N-ethyl-N-n-butylthiolcarbamate, B.P. (10 mm.) 157.0–158.0° C., $n_D^{30}$ 1.4953.

The following data were obtained:

| Compound | Oats | | Cucumbers | | Radish | |
|---|---|---|---|---|---|---|
| | Germ.[1] | Growth[2] | Germ. | Growth | Germ. | Growth |
| R-2985 | 0 | -- | 5 | 1 | 10 | 2 |
| R-3075 | 25 | 0 | 50 | 4 | 100 | 10 |
| R-3078 | 25 | 0+ | 25 | 1 | 100 | 8 |
| R-3073 | 100 | 0+ | 100 | 2 | 100 | 8 |
| R-3072 | 100 | 0+ | 100 | 2 | 100 | 8 |
| R-3079 | 0 | -- | 25 | 1 | 100 | 7 |
| R-2808 | 0 | -- | 0 | -- | 15 | 0+ |
| R-2809 | 0 | -- | 0 | -- | 50 | 4 |
| R-3091 | 0 | -- | 0 | -- | 50 | 7 |
| R-3084 | 0 | -- | 0 | -- | 100 | 8 |
| R-3083 | 0 | -- | 0 | -- | 50 | 4 |
| R-3092 | 0 | -- | 25 | 2 | 50 | 7 |

[1] Percent germination.  [2] Growth.

The above tests were then repeated using application rates of 10 and 40 pounds per acre with the following results:

| Compound | Lbs./acre | Peas | | Corn | | Radish | | Oats | | Cucumber | |
|---|---|---|---|---|---|---|---|---|---|---|---|
| | | Ge.[1] | Gr.[2] | Ge. | Gr. | Ge. | Gr. | Ge. | Gr. | Ge. | Gr. |
| R-2985 | 10 | 100 | 7 | 100 | 10 | 100 | 10 | 10 | 0+ | 100 | 9 |
| | 40 | 100 | 3 | 100 | 9 | 100 | 10 | 0 | -- | 100 | 5 |
| R-3075 | 10 | 100 | 10 | 100 | 10 | 100 | 10 | 60 | 0+ | 100 | 10 |
| | 40 | 100 | 10 | 100 | 10 | 100 | 10 | 20 | 0+ | 100 | 10 |
| R-3078 | 10 | 100 | 10 | 100 | 10 | 100 | 10 | 100 | 1 | 100 | 10 |
| | 40 | 100 | 10 | 100 | 10 | 100 | 10 | 60 | 0+ | 100 | 10 |
| R-3073 | 10 | 100 | 10 | 100 | 10 | 100 | 10 | 100 | 1 | 100 | 10 |
| | 40 | 100 | 10 | 100 | 10 | 100 | 10 | 60 | 0+ | 100 | 10 |
| R-3072 | 10 | 100 | 10 | 100 | 10 | 100 | 10 | 60 | 2 | 100 | 10 |
| | 40 | 100 | 7 | 100 | 8 | 100 | 9 | 10 | 1 | 100 | 10 |
| R-3079 | 10 | 100 | 8 | 100 | 10 | 100 | 8 | 100 | 0+ | 100 | 10 |
| | 40 | 100 | 6 | 100 | 10 | 100 | 7 | 5 | 0+ | 100 | 10 |
| R-2808 | 10 | 100 | 5 | 100 | 10 | 100 | 10 | 100 | 0+ | 100 | 9 |
| | 40 | 100 | 2 | 100 | 5.5 | 100 | 7.5 | 30 | 0+ | 0 | -- |
| R-2809 | 10 | 100 | 4 | 100 | 10 | 100 | 10 | 100 | 0+ | 100 | 10 |
| | 40 | 100 | 3 | 100 | 7.5 | 100 | 7 | 0 | -- | 15 | 5 |
| R-3091 | 10 | 100 | 3 | 100 | 8 | 100 | 9 | 10 | 0+ | 100 | 10 |
| | 40 | 100 | 2 | 100 | 8 | 50 | 4 | 5 | 0+ | 100 | 8 |
| R-3084 | 10 | 100 | 5 | 100 | 10 | 100 | 10 | 30 | 0+ | 100 | 4 |
| | 40 | 100 | 1 | 100 | 10 | 20 | 4 | 0 | -- | 20 | 0+ |
| R-3083 | 10 | 60 | 4 | 100 | 10 | 100 | 10 | 20 | 0+ | 30 | 5 |
| | 40 | 40 | 2 | 100 | 7 | 100 | 10 | 0 | -- | 10 | 1 |
| R-3092 | 10 | 100 | 3 | 100 | 10 | 100 | 10 | 20 | 0+ | 100 | 7 |
| | 40 | 20 | 1 | 100 | 10 | 100 | 7 | 0 | -- | 100 | 5 |

[1] Percent germination.  [2] Growth.

*Analysis.*—Calcd. for $C_{12}H_{23}NOS$: N, 6.11%. Found: N, 6.10%.

Example XII (*R-3092*).—When the general procedure of Example I was repeated except that 10.9 g. (0.11 mole) of N-methallylethylamine, 8.2 g. (0.05 mole) of cyclopentyl chlorothiolformate and 100 cc. of ethyl ether were employed, there was obtained 8.5 g. (74.9% yield) of cyclopentyl N-methallyl-N-ethylthiolcarbamate, B.P. (10 mm.) 149.5–150.0° C., $n_D^{30}$ 1.5063.

*Analysis.*—Calcd. for $C_{12}H_{21}NOS$: N, 6.16%. Found: N, 6.05%.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under test was applied to the pots in a drench at the rate of 365 pounds per acre. The pots were placed in a greenhouse and watered at suitable intervals and the germination and growth of the seeds was compared with similarly planted seeds to which no herbicide was added. In each case, germination (Germ. or Ge.) was reported on the scale of 0–100%, while growth (Gr.) was reported on the scale of 0–10, based on the seeds which germinated. Thus, 100–10 indicates normal germination and normal growth.

The compounds of the present invention may be used in preemergence or postemergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particularly advantageous way of applying the compounds is as a narrow band along a row crop, straddling the row.

We claim:

1. The method of combating weeds comprising applying a phytotoxic amount to the soil of a compound:

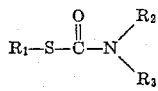

wherein $R_1$ is a cycloalkyl radical and wherein $R_2$ and $R_3$ are selected from the same and different lower alkyl radicals and the unsubstituted allyl radical.

2. The method of claim 1 wherein the compound is applied at the rate of 1 to 500 pounds per acre.

3. The method of claim 1 wherein the compound is cyclohexyl N,N-di-n-propylthiolcarbamate.

4. The method of claim 1 wherein the compound is cyclohexyl N-ethyl-N-n-butylthiolcarbamate.

5. The method of claim 1 wherein the compound is cyclohexyl N-allyl-N-n-propylthiolcarbamate.

6. The method of claim 1 wherein the compound is cyclohexyl N,N-diallylthiolcarbamate.

7. The method of claim 1 wherein the compound is cyclohexyl N-2-methyl-allyl-N-ethylthiolcarbamate.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,562,011 | Baumgartner | July 24, 1951 |
| 2,642,451 | Weijlard et al. | June 16, 1953 |
| 2,687,348 | Kosmin | Aug. 24, 1954 |
| 2,901,498 | Tilles et al. | Aug. 25, 1959 |
| 2,901,500 | Tilles et al. | Aug. 25, 1959 |
| 2,913,327 | Tilles et al. | Nov. 17, 1959 |
| 2,916,370 | Tilles et al. | Dec. 8, 1959 |
| 2,941,879 | Goodhue | June 21, 1960 |
| 2,992,091 | Harman et al. | July 11, 1961 |

OTHER REFERENCES

Gentner et al.: "An Evaluation of Several Chemicals for Their Herbicidal Properties," January 1958, pages 5, 6, and 10, U.S. Agric. Research Service, Crops Research Div.

Davies et al.: in "Biochemical Journal," vol. 40, 1946, pages 331–334.